United States Patent [19]

Nakashima et al.

[11] Patent Number: 5,000,032
[45] Date of Patent: Mar. 19, 1991

[54] WEB POSITION DETECTING METHOD

[75] Inventors: Hiroshi Nakashima; Kiyoshi Okutsu; Sanshirou Fukuhara, all of Kanagawa, Japan

[73] Assignee: Fuji Photo Film Co., Ltd., Kanagawa, Japan

[21] Appl. No.: 438,956

[22] Filed: Nov. 17, 1989

Related U.S. Application Data

[63] Continuation of Ser. No. 59,985, Jun. 9, 1987, abandoned.

[30] Foreign Application Priority Data

Jun. 9, 1986 [JP] Japan .................. 63-131935

[51] Int. Cl.$^5$ .................................................. G01B 13/00
[52] U.S. Cl. .......................................... 73/37.6; 226/22
[58] Field of Search .................. 73/37.5, 37.6, 37.7, 73/37.8, 159; 226/22, 15

[56] References Cited

U.S. PATENT DOCUMENTS

| | | | |
|---|---|---|---|
| 2,539,131 | 1/1951 | Gudersen et al. | 73/37.7 |
| 2,687,885 | 8/1954 | Kroth | 226/22 |
| 2,884,495 | 4/1959 | Frankel | 73/377 |
| 3,039,483 | 6/1962 | Deering | 73/377 |
| 3,159,170 | 12/1964 | Callan | 226/22 |
| 3,243,993 | 4/1966 | Jacobsen | 73/37.7 |
| 3,342,284 | 9/1967 | Baird | 73/37.7 |
| 3,363,453 | 1/1968 | Erickson | 73/37.6 |
| 3,494,177 | 2/1970 | Eckerlin | 73/37.7 |
| 3,608,797 | 9/1971 | Hindle et al. | 226/22 |
| 3,863,491 | 2/1975 | Molins et al. | 73/37.6 |

FOREIGN PATENT DOCUMENTS

| | | | |
|---|---|---|---|
| 1965231 | 10/1970 | Fed. Rep. of Germany | 73/37.5 |
| 244806 | 12/1985 | Japan . | |
| 506677 | 6/1976 | U.S.S.R. | 73/37.7 |

Primary Examiner—Hezron E. Williams
Attorney, Agent, or Firm—Sughrue, Mion, Zinn, Macpeak & Seas

[57] ABSTRACT

A web position detecting method and apparatus for a device which conveys a web floated with air streams jetted from air jetting holes. Pressure detecting units are positioned along both side edges of the web to detect the pressures of the air streams thereby to determine the position of the web in its widthwise direction by a difference of the pressures.

13 Claims, 1 Drawing Sheet

WEB POSITION DETECTING METHOD

This is a Continuation of Application Ser. No. 07/059,985 filed June 9, 1987, now abandoned.

REFERENCE TO RELATED APPLICATIONS

This invention relates to U.S. application Ser. No. 005,819, filed Jan. 21, 1987, entitled FLOATING TYPE WEB GUIDING DEVICE; U.S. application Ser. No. 005,986, filed Jan. 21, 1987, entitled AIR JETTING BOX; and U.S. application Ser. No. 074,817, filed July 17, 1987, entitled METHOD AND APPARATUS OF NON-CONTACT CONVEYANCE OF A WEB, all assigned to the common assignee.

BACKGROUND OF THE INVENTION

1. Field of the Invention

This invention relates to a web position detecting method for a device which is adapted to convey and/or dry a continuously supplied elongated belt-shaped support (hereinafter referred to as "a web") under low tension in a non-contact mode while floating the web with air streams jetted from a number of air jetting holes.

2. Background of the Invention

Heretofore, in conveying and/or drying a paper or film web, a web position control device is used in order to eliminate the difficulty that the web is creased, dried irregularly or broken because the web runs zigzag or shifts to a side and the resultant product is low in quality. If a web is detected to be displaced from its desired position, manual or automatic equipment realigns the web by shifting or tilting rollers used for conveying the web.

For the web position control, it is essential to accurately detect the web position. For this purpose, a variety of web position detecting methods have been employed in the art. One web position detecting method uses a special air nozzle. Another web position detecting method uses an image sensor or television camera. A third web position detecting method uses an optical sensor is used. A fourth web position detecting method employs ultrasonic waves.

However, in the case of photo-sensitive materials such as photographing films, the detecting method in which optical sensors are used, or the detecting method in which an image sensor or television camera is employed is not practical because the photo-sensitive materials are sensitive to light and the necessary equipment is intricate. In the case of the detecting method in which ultrasonic waves are employed, the place where it can be used is limited, and the detection accuracy is liable to be low. Accordingly, the web position detecting method in which, as shown in FIG. 1, a special air nozzle 5 is used is extensively employed in the art. In this detecting method, the air nozzle 5 is arranged on one side of a web 4 and an air receiving inlet 6 for receiving the air stream jetted from the air nozzle 5 is disposed on the other side of the web 4 in such a manner that it confronts the air nozzle 5. As a result, the position of the web 4 is detected from the variation in pressure of the air stream received by the air receiving inlet 6.

However, in the case where a web 4 is conveyed and/or dried while being floated by the air stream, i.e., it is conveyed and/or dried in a so-called "non-contact mode". The pressure of the air stream jetted from air jetting hole, being high, greatly disturbs the detecting air jetted from the special detecting air nozzle 5. As a result, sometimes it is impossible to accurately detect the position of the web 4. Furthermore, the detecting method in which the special air nozzle is employed suffers from the difficulty that, when the side edge portions of the web are curled, the side edges portions may touch the nozzle to provide an unacceptable product.

A web position detecting method which is effective in eliminating the above-described difficulties accompanying the conventional detecting method has been disclosed in Japanese Patent Application (OPI) No. 244806/1985. (the term "OPI" as used herein meaning an "unexamined published application"). In the web position detecting method thus disclosed, the back pressure of the web is utilized. However, the detecting method is still disadvantageous in the following points. In this method, the back pressure of a web floated depends considerably on the width and tension of the web. For instance, if the tension is small, then the back pressure is low. Therefore it is difficult to accurately detect the position of the web. If the width of the web changes, the back pressure also changes. In addition, employing the position detection signal obtained in the detecting method as an input signal to the web position control device as it is cannot provide an ideal (web position with back pressure) control characteristic.

SUMMARY OF THE INVENTION

Accordingly, an object of this invention is to eliminate the above-described difficulties accompanying a conventional web position detecting method.

More specifically, an object of the invention is to provide a web position detecting method in which the positions of the two side edges of a web can be detected with high accuracy irrespective of the tension and width of the web, and the detection signal can be used as a control input signal as it is.

Another object of the invention is to provide a web position detecting method which is applicable to webs for photosensitive materials and which can be employed in a high temperature or explosive atmosphere.

The foregoing objects and other objects of the invention have been achieved by the provision of a web position detecting method for a device for conveying and/or drying a continuously supplied web while floating the web with air streams jetted from a plurality of air jetting holes. According to the invention, pressure detecting units are disposed near both sides edges of the web in such a manner that the pressure detecting units confront with the air jetting holes and are respectively positioned on both sides of the web in the widthwise direction of the web to measure the pressures of the air streams jetted from the air jetting holes to detect the position of the web in the widthwise direction the web.

The nature, principle and utility of the invention will become more apparent from the following detailed description when read in conjunction with the accompanying drawing.

DETAILED DESCRIPTION OF THE INVENTION

One preferred embodiment of this invention will be described with reference to the accompanying drawing.

Figure 2:
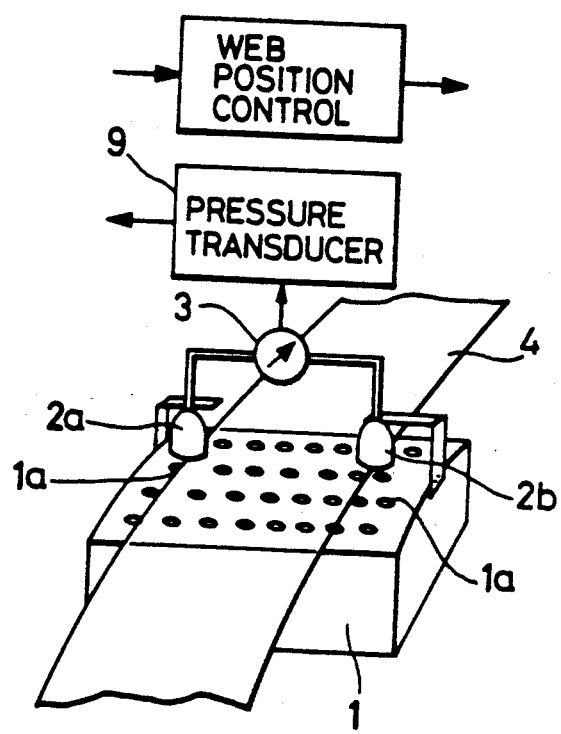
FIG. 2 is a perspective view showing one example of a web position detecting method according to this invention.

FIG. 2 is an explanatory diagram showing one example of a web position detecting method according to the invention. As shown in FIG. 2, an air jetting box 1 for floating a web 4 has a number of air jetting holes 1a through which air is jetted upwardly to float the web 4 above the air jetting box 1. In the method of the invention, a pair of cylindrical pressure detecting units 2a and 2b each having a relatively large opening are arranged in such a manner that the openings are confronted with the air jetting holes 1a and located near both side edge of the web. The pressure of air from the air jetting holes 1a are applied through the pressure detecting unit 2a and 2b to a pressure measuring unit 3. The pressure measuring unit 3 outputs the differential pressure detected by the two pressure detecting units 2a and 2b. The differential pressure is applied, as an input signal, to a web position control device 8, as it is, or converted into an electrical signal by a pressure transducer 9 as the case may be. In the latter case, the electrical signal is applied, as an input signal, to the web position control device 8.

Figure 3:
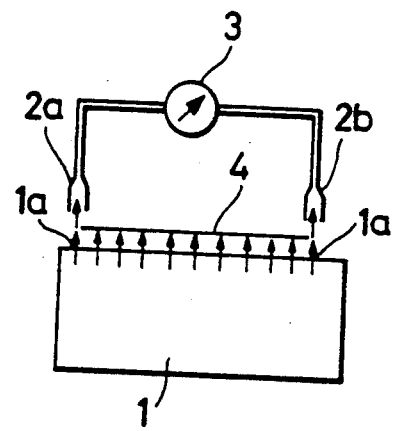
FIG. 3 is a side view showing an air jetting pressure detecting units, a pressure measuring unit and a web in FIG. 2.
Figure 4:
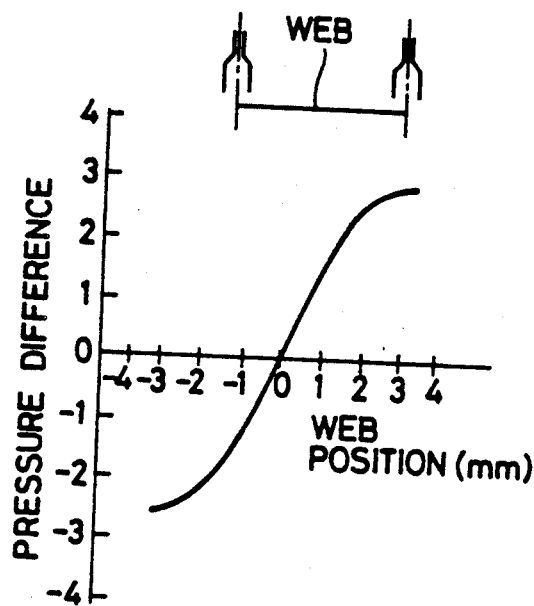
FIG. 4 is a graphical representation indicating web position with difference pressure for a description of the web position detecting method according to the invention.

FIG. 3 is a side view of the air jetting box 1, pressure detecting units 2a and 2b and pressure measuring unit 3 shown in FIG. 2, contributing to a full understanding of FIG. 2. FIG. 4 is a graphical representation indicating the relationship between the web position and the differential pressure output (converted into electrical signals) which are obtained by the pressure detecting method shown in FIG. 2. As it apparent from the graphical representation of FIG. 4, when the web is not shifted to either side (the web position 0 (zero)), the differential pressure output is zero (0). The characteristic curve indicating web position with differential pressure output in FIG. 4 shows that the variation of the differential pressure output obtained according to the web position detecting method of the invention can be sufficiently effectively used as the input signal of the web position control device 8. Since the differential pressure signal can be used as an input to a servo system to correct the web position, it is not required to linearize the curve of FIG. 4. The significant factor is that the sign of the differential pressure signal indicates the required direction for correction.

Figure 5:
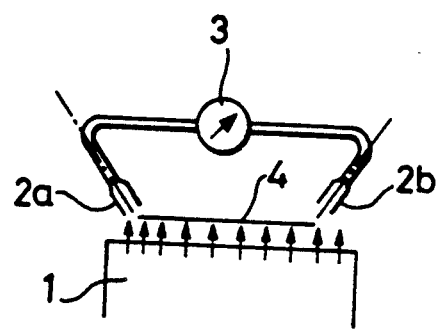
FIG. 5 is a side view showing one modification of the web position detecting method according to the invention.
Figure 1:
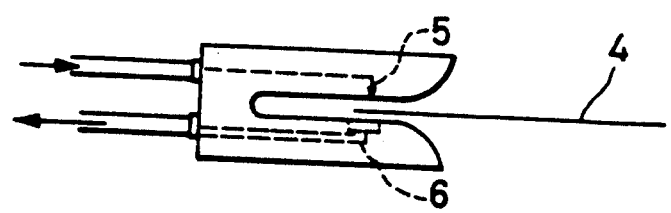
FIG. 1 is a side view showing a part of a conventional web position detecting method in which a special air nozzle is employed.

FIG. 5 is an explanatory diagram showing one modification of the pressure detecting units 2a and 2b according to the invention. That is, in the modification, the pressure detecting units 2a and 2b are somewhat inclined. More specifically, they are extended radially from near both side edges of the web, as shown in FIG. 5, because the stream of air jetted from the air jetting holes at the two side edges of the web are somewhat inclined outwardly from the web. Therefore, the pressure detecting units 2a and 2b are more sensitive to air pressure variation than those which are arranged perpendicularly, as shown in FIG. 2. The web position detecting method in which the pressure detecting units are inclined with respect to the web and accordingly to the air jetting box, as described above, also falls within the technical concept of the invention that the pressure detecting units are confronted with the air jetting holes.

Examples of the web employed in the invention are ones of paper, film and/or metal. The web position detecting method of the invention is effectively applicable to the supports which are used for manufacturing photographing photo-sensitive materials such as photographing films and print paper, magnetic recording materials, and data recording materials such as pressure-sensitive copying sheets and heat-sensitive copying sheets.

As was described above, in the method of the invention, the pressure detecting units are arranged near both side edges of the web in such a manner that they are confronted with the air jetting holes. This means that the pressure detecting units adapted to receive the stream of air jetted from the air jetting holes are so disposed that, when the web is displaced aside, the stream of air from the air jetting holes confronted with the pressure detecting units are partially intercepted by the web thus displaced or permitted to freely flow, as a result of which the pressures detected by the pressure detecting units change. The interference area of the web between the air jetting holes and the pressure detecting units is in a range from 0% to 100% depending on the depending on the operating conditions.

A typical example of the pressure detecting units of the invention is a unit of the air receiving inlet type that completely receives the pressure of air jetted from the air jetting hole. However, in order to detect the pressure variation with high accuracy, it is desirable to increase the area of the air receiving inlet. The sectional configuration of the air receiving inlet may be circular or polygonal.

In order to detect the shift of the web, one pressure detecting unit may be disposed near one of the two side edges of the web so that the displacement of the web is detected as the pressure variation. However, in order to improve the accuracy of measurement, it is preferable that two pressure detecting units are arranged near the two side edges of the web, respectively so that the shift of the web is detected from the differential pressure between the air stream pressures detected by the two pressure detecting units.

In the web position detecting method of the invention, the pressure detecting units may be positioned relatively far vertically from the web so that, even when the web curls, the pressures can be detected without the contact between pressure detecting units and the web.

In the method of the invention, the pressure detecting units are arranged near both side edges of the web in such a manner that they are confronted with the air jetting holes, as was described above. Therefore, when the web is shifted to one side or the other, the stream of air jetted from the air jetting holes towards each pressure detecting unit is, depending on the direction of the web shift, partly intercepted by the web or permitted to freely flow. Therefore, the pressure detected by the pressure detecting unit varies up or down. This pressure variation is utilized to detect the shift of the web. In the case where the pressure detecting units are disposed near both side edges of the web so that the differential pressure detected thereby is employed as the detection pressure, the pressure variation is about twice as large as that which is provided in the case where the pressure detecting unit is provided near only one side edge of the web. That is, the dual sided case offers higher detection accuracy than the single sided case.

In the method of the invention, unlike Japanese Patent Application (OPI) No. 244806/1985 in which only a back pressure (static pressure) is measured, the total pressure is measured, and therefore the pressure value and the variation value are large and depend on the velocities of air jetted from the air jetting holes without being affected by the tension and the width of the web. Accordingly, the pressure value, depending on the air jetting velocity, is high in stability, and the differential pressure variation value is large and not affected by other factors when the pressure changes. Therefore, the differential pressure variation is excellent in response characteristic and can be used as a web position control input signal as it is. Total pressure as used here and in the claims means the combination of both static and dynamic pressure.

As was described above, in the web position detecting method of the invention, the pressure detecting units are disposed near both side edges of a web in such a manner that they are confronted with the air jetting holes and located on both sides of the web, respectively. As a result the pressures of the air stream jetted from the air jetting holes are measured to detect the position of the web in its widthwise direction. Therefore:

(1) The web position detecting method of the invention is suitable for the manufacture of webs for photosensitive materials, and can be employed even in the atmosphere which is high in temperature or may be explosive.

(2) Even when the web curls, the position of the web can be detected without the web being damaged.

(3) Even if the tension and/or width of the web changes, the web position detection signal can be stably obtained. Therefore, the control mechanism can be correspondingly simplified.

(4) The detected pressure is so large that it can be applied, as an input signal, to the web position control device as it is. Therefore, the position control accuracy is high.

(5) The pressure detecting units can be readily moved in order to use the web position detector with a web different in width from the previously handled one.

We claim:

1. A method for detecting a lateral position of a web, comprising the steps of:
   conveying a web over an air jetting box;
   jetting air streams through air jetting holes in said air jetting box toward said web, a plurality of said air jetting holes jetting air toward said web to support said web and at least one other of said air jetting holes jetting air toward said web and adjacent at least one edge of said web for use in detecting a lateral position of said web, said plurality of said air jetting holes and said at least one other air jetting hole being of substantially the same size and being in communication with a common source of air;
   positioning at least one pressure detecting unit adjacent at least one edge of said web facing said at least one other air jetting hole and on a side of said web opposite said air jetting box;
   detecting a total pressure in said at least one pressure detecting unit;
   using said detected pressure as an indication of a position of said web transverse to said direction in which said web is being conveyed.

2. A method as recited in claim 1, wherein said positioning step positions two pressure detecting units adjacent opposite edges of said web and said detecting step detects a differential pressure between said two pressure detecting units.

3. A method as recited in claim 2, wherein said pressure detecting units have respective measuring apertures and wherein said positioning step aligns said apertures to be perpendicular to a major surface of said web.

4. A method as recited in claim 2, wherein said pressure detecting units have respective measuring apertures and wherein said positioning step aligns said apertures to be inclined toward a middle of said web in opposing directions to a major surface of said web.

5. A method as recited in claim 1, further comprising aligning said transverse position of said web according to said indication of said transverse position.

6. A position detecting device, comprising:
   an air jetting box having a plurality of air jetting holes for jetting air streams through said air jetting holes to support a web conveyed above said air jetting holes; and at least one other air jetting hole for jetting an air stream toward said web adjacent at least one edge thereof for use in detecting a lateral position of said web, said plurality of air jetting holes and said at least one other air jetting hole being of substantially the same size and being in communication with a common source of air; and
   at least one pressure detecting unit disposed adjacent an edge of said web facing said at least one other air jetting hole on a side of said web opposite said air jetting box, said at least one pressure detecting unit having a relatively large opening for receiving a total pressure of said air stream from said at least one other air jetting hole.

7. A position detecting device as recited in claim 6, wherein there are two pressure detection units disposed adjacent opposite edges of said conveyed web and further comprising means for measuring a differential pressure measured by said two pressure detecting units.

8. A position detecting device as recited in claim 7, wherein said two pressure detecting units have respective measuring apertures aligned to be perpendicular to a major surface of said conveyed web.

9. A position detecting device as recited in claim 7, wherein said two pressure detecting units have respective measuring apertures aligned to be inclined toward a middle of said conveyed web in opposing directions to a major surface of said conveyed web.

10. A position detecting device as recited in claim 6, further comprising means for controlling a transverse positioning of said conveyed web in response to an output of said at least one pressure detecting unit.

11. A method as recited in claim 1, wherein said pressure detecting step is performed by receiving an air stream from said air jetting holes having a uniform size.

12. A method as recited in claim 1, wherein said step of jetting air streams through air jetting holes comprises jetting air through air jetting holes in a surface of said air jetting box which faces said web and which is planar in a direction transverse to said direction of web movement.

13. A position detecting apparatus as recited in claim 6, wherein an surface of said air jetting box facing said web is planar in a direction transverse to a direction of web movement.

* * * * *

UNITED STATES PATENT AND TRADEMARK OFFICE
CERTIFICATE OF CORRECTION

PATENT NO. : 5,000,032

DATED : March 19, 1991

INVENTOR(S) : Nakashima et al

It is certified that error appears in the above-identified patent and that said Letters Patent is hereby corrected as shown below:

Title page, Section [30], Heading "Foreign Application Priority Data", delete "63-131935" and insert --61-131935--.

Signed and Sealed this

Tenth Day of November, 1992

Attest:

DOUGLAS B. COMER

*Attesting Officer*   Acting Commissioner of Patents and Trademarks